Sept. 17, 1968   G. ALTMAN   3,401,593

PROJECTION SYSTEM FOR REFLECTED IMAGES UTILIZING POLARIZED LIGHT

Filed Oct. 11, 1965

INVENTOR.
Gerald Altman
BY Morse, Altman & Oates
ATTORNEYS 3,401,593
PROJECTION SYSTEM FOR REFLECTED IMAGES
UTILIZING POLARIZED LIGHT
Gerald Altman, 41 Westminster Road,
Newton Center, Mass. 02159
Filed Oct. 11, 1965, Ser. No. 494,813
14 Claims. (Cl. 88—24)

ABSTRACT OF THE DISCLOSURE

An optical projector for imaging a visual subject on a screen. The visual subject is optically associated with a nondepolarizing, reflecting background, and is illuminated by light of a specified polarization form which is transmitted from a source via a Brewster's angle polarizer. The visual subject is imaged on a screen by light of a crossed polarization form which is returned from the nondepolarizing, reflecting background via the Brewster's angle polarizer. In one form, the nondepolarizing, reflecting background is a reflex reflecting sheet.

Background and summary of the invention

The present invention relates to optical projection systems and, more particularly, to the image projection onto a viewing screen of opaque subject matter or the like, such as photographic prints ordinarily viewed directly, geometric contours of manufactured parts for quality control, overhead projection of visual exhibits being presented, etc. Difficulties have been encountered in efficiently utilizing illumination originally available at the source.

A primary object of the present invention is to improve illumination in opaque optical projection or the like, by locating a polarizing beam splitter at the illumination source and locating (or integrating) a reflex-reflector or other nondepolarizing reflector at (or with) the subject matter to be imaged. The reflex-reflector or other nondepolarizing reflector is such that although polarized illuminating radiation from the source is transmitted (or reflected) efficiently through (or by) the beam splitter, polarized imaging radiation from the subject may be reflected (or transmitted) efficiently by (or through) the beam splitter. In other words the polarization form of the illuminating radiation and the polarization form of the imaging radiation are different (e.g., are linearly polarized at right angles) so that with a polarizing beam splitter (e.g., a "pile-of-plates" or reflecting beam-splitter at Brewster's angle), relatively high transmission of one polarization form through the beam splitter and relatively high reflection of the other polarization form by the beam splitter (e.g., via a quarter-wave plate between the beam splitter and the reflex reflector which establishes reversed incident and returned circularly polarized beams), together, are possible.

Other objects of the present invention are: to illuminate different contacting, nonoverlapping sections of a subject with different beams of polarized radiation in order to project a composite image for observation monocularly in terms of the polarized radiation, the arrangement being such that the visual effect on the observer of the composite image is the same as if it were in terms of unpolarized radiation; and to utilize a distribution of minute reflex reflecting elements as a conveniently located composite reflector in order to render a beam splitter compact while effecting nondepolarizing deflection of radiation directed therethrough.

Other objects of the present invention will in part be obvious and will in part appear hereinafter.

The invention accordingly comprises the several components and steps and their interrelationships, which are exemplified in the following detailed disclosure, the scope of which will be indicated in the appended claims.

Brief description of drawing

For a fuller understanding of the nature and objects of the present invention, reference should be had to the following detailed description, taken in connection with the accompanying drawings, wherein.

Detailed description

Generally, projection of images in accordance with the present invention involves: an opaque projector and an opaque subject in relative proximity; and a viewing screen relatively remote therefrom. In the opaque projector, a reflection polarizing stratum and quarter wave (retardation) stratum, together, direct originally polarized, illuminating radiation from a white light source to the subject and direct differently polarized, imaging radiation from the subject to a viewing screen. Generally, the subject is in optical communication with minute reflex reflecting elements, which are dispersed in a stratum. Each reflex reflecting element ordinarily is no more than 0.1 inch in maximum extent and preferably is no more than 0.01 inch in maximum extent. Each reflex reflecting element inherently serves to acquire an original ray incident substantially from a given direction and to redirect a resulting ray substantially in the opposite direction. In the opaque projector, the source of illumination and the projection lens, in optical effect, are positioned in coincidence with respect to the representation formed on the viewing screen.

Figure 1:
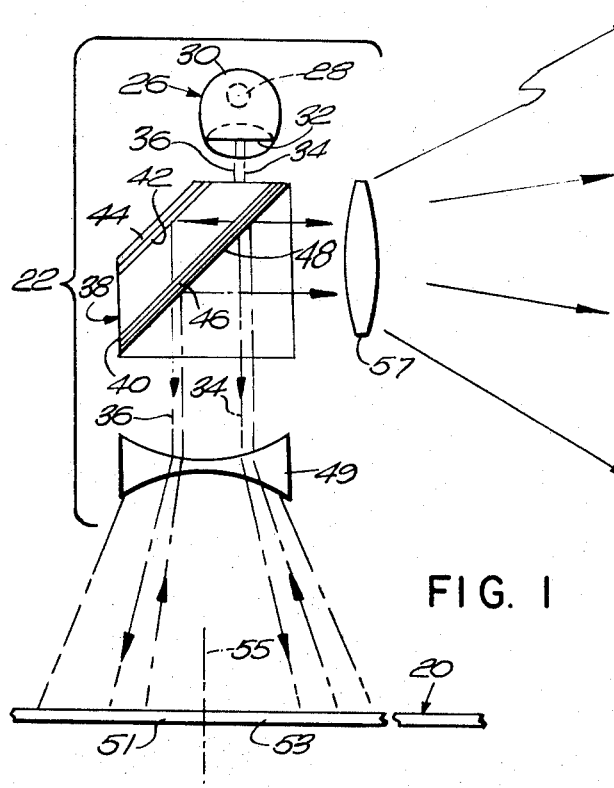
FIG. 1 is a schematic view of an image projection system, embodying the present invention.

The projecting system of FIG. 1, which is designed primarily for the photographic products of FIG. 2, generally includes: in relatively close combination, a laminated photographic sheet 20 having a reflex reflecting representation, and a projector subsystem 22 in communication with photographic sheet 20; and in relatively remote combination, a projection screen 24 of the type having dispersed metallic particles, glass spheres or white pigment as an image viewing matrix. In the system of FIG. 1, projector subsystem 22 and photographic sheet 20 are located in the same light-tight housing although it will be understood that projector subsystem 22 and photographic sheet 20 alternatively may be located at mechanically isolated positions.

In projector subsystem 22, the source of illumination 26 includes an electrically energized, incandescent white light source 28, a curved reflector 30 and a collimating lens 32. Illumination from source 26 is divided into two differently polarized beams 34, 36 by a beam splitter generally designated by 38. Beam splitter 38 is shown as including an optically clear, prism arrangement, composed of a vitreous material such as glass or quartz or a plastic material such as methyl methacrylate. This prism has opposed forward and rearward oblique parallel faces that are angularly disposed at 45° with respect to the axis of source 26. At the forward oblique face of beam splitter 38 is a thin film, reflection polarizing stratum 40 composed for example of alternate high and low refractive index materials, e.g., glass and titanium dioxide, as explained in U.S. Patent No. 2,403,731, issued July 9, 1946, in the name of Stephen M. MacNeille for Beam Splitter. At polarizing stratum 40, the division occurs between aforementioned beams 34, 36, which are approximately equal in intensity and are linearly polarized in mutually perpendicular planes. Beam 34 is transmitted through polarizing stratum 40 and beam 36 is reflected by polarizing stratum 40. Laminated at the rear face of beam splitter 38 are a quarter wave stratum 42 and a metallic reflecting stratum 44. Quarter wave stratum, for example, is composed of anisotropic, molecularly oriented, polyvinyl alcohol and metallic reflecting stratum 44, for example, is composed of highly reflective metal such as silver or aluminum.

The plane of polarization of beam 36, which as indicated above initially is reflected by polarizing stratum 40, is rotated through 90° by transmission through quarter wave plate 42, reflection by reflecting stratum 44 and retransmission through quarter wave stratum 42, whereby its transmission through polarizing stratum 40 becomes possible. Thus, both beams, which constitute a high percentage of all available radiation from source 26, are directed toward sheet 20.

Figure 2B:
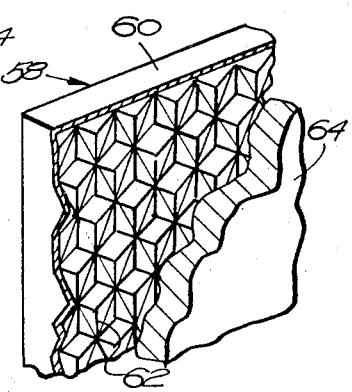
FIG. 2 illustrates, in exaggerated cross-section and perspective, components of the system of FIG. 1.
Figure 2A:
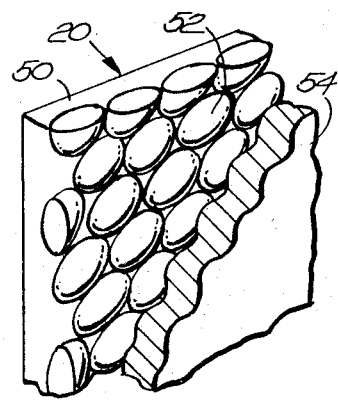

Sheet 20 of FIG. 1, as shown in FIG. 2(a) in laminated sequence, comprises an opaque base stratum 50, a reflex reflecting stratum 52 and an exposed and developed photographic print stratum 54. Details of the materials of the strata of sheet 20 are as follows. Base stratum 50 is composed either of paper, i.e., a felted sheet of cellulosic fibers, or plastic, i.e., a cellulosic polymer such as cellulose nitrate, cellulose propionate or cellulose butyrate. Reflex reflecting stratum 52 is composed of minute glass spheres each constituting a lens having opposed spherical surfaces, one of which acquires radiation from substantially any given direction for transmission through the lens and the other of which is contiguous with a reflective metal interface that redirects the radiation through the lens in substantially the opposite direction. Such a reflex reflecting stratum is disclosed in: U.S. Patent No. 2,997,403, issued Aug. 22, 1961 in the name of Charles E. Seright for Reflex Reflective Coating Composition; and U.S. Patent No. 2,963,378, issued Dec. 6, 1960, in the name of Philip V. Palmquist for Glass Beads Hemispherically Reflectorized With Metallic Coating and Compositions Thereof. Photographic print stratum 54, which is in terms of differentially deposited silver grains, is derived, for example, by developing and fixing a photoexposed silver halide emulsion in which one or more of the silver halides, for example silver chloride, silver bromide and silver iodide, are dispersed in or on a suitable colloid, such as gelatin of silica gel. Development is effected by an aqueous, alkali active developer such as hydroquinone, metol, amidol, etc., and fixation is effected with a silver halide solvent, such as sodium thiosulfate or sodium thiocyanate. Alternatively the photographic print is produced by silver transfer diffusion involving the application of developing agent and silver complexing agent to a silver halide emulsion and the differential transfer of a resulting silver complex to a receiving stratum at which silver grains are differentially reduced.

The product of FIG. 2(b), shown generally at 58, includes in laminated sequence, a support stratum 60, a reflex reflecting stratum 62 and a photographic print stratum 64. Support stratum 60 and photographic print stratum 64 are identical to their counterparts at 50, 54 in FIG. 1. Reflex reflecting stratum 62, which is composed of any dimensionally stable plastic material such as methyl methacrylate, presents a multiplicity of minute cube corners, which are embossed in stratum 62 and metallized. For example, the cube corners are approximately 1/8 inch in maximum extent and are metallized with a coating of aluminum or silver approximately 0.0001 inch thick.

Beams 34, 36, after separation in beam splitter 38, are directed through a quarter wave stratum 46, of the same composition as quarter wave stratum 42. Quarter wave stratum 46 converts the linear polarization forms of beams 34, 36 to circular polarization forms for transmission through a negative lens 49 to substantially contacting, substantially nonoverlapping sections 51, 53 of subject 20, which are shown separated by phantom line 55. Since the incident and returned circular polarization reverses circular direction at subject 20, the resulting linear polarization is crossed with respect to the original linear polarization at polarizing stratum 40. In consequence, reflection occurs through an objective lens 57 to viewing screen 24. Suitable color and density correction strata 48, 49 are provided in order to optically conform the two halves of the image. Screen 24 may be either depolarizing or nondepolarizing without physiological effect in an observer because his vision of the viewing screen is monocular.

Figure 2C:
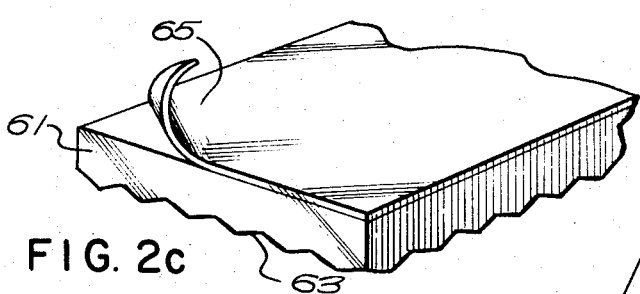

It will be understood that a wide variety of subjects are contemplated for projection in the foregoing manner. Thus in other embodiments of the present invention, the photographic prints of strata 54, 64 of FIG. 2 are replaced by photographic prints derived from ferric, diazo, bichromated gelatine, photoplastic, photoconductive, etc., processes. It will be understood that in an overhead projection system embodying the present invention, photographic print strata 54, 64 are omitted from the products of FIGS. 2(a) and (b) and replaced by print receptive strata (e.g., a microstriated polymer) of a type which may directly receive pencil, crayon or ink markings during the projection process. In another embodiment of the invention, as shown in FIG. 2(c), the subject comprises: a rigid transparent plate 61, composed for example of glass or methyl methacrylate, the lower face of which is provided with metallized cube corners 63; and a photographic transparency 65, removably disposed on the smooth upper face of plate 61.

Figure 3:
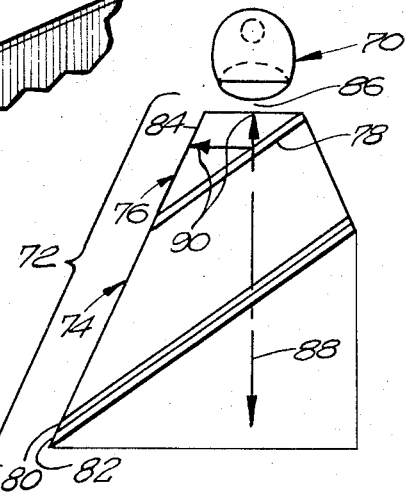
FIG. 3 is a schematic view of part of another image projection system, embodying the present invention.

FIG. 3 illustrates part of another opaque projection system embodying the present invention, the illumination source 70 and beam splitter 72 being shown, and the opaque subject and viewing screen being omitted for simplicity. Illumination source 70 is similar in all respects to illumination source 26 of FIG. 1, except that it is designed to present a diverging beam of radiation. The opaque subject and viewing screen of the system of FIG. 3 are similar to their counterparts at 20, 24 in FIG. 1.

Beam splitter 72 is composed of an optically clear material, for example, a vitreous material such as glass or quartz or a plastic material such as methyl methacrylate. The interface between prisms 74, 76, which is disposed at an angle of 45° with respect to the axis of source 70, is provided with a pile-of-plates or reflecting polarizer 78, of the type referred to in FIG. 1 at 40. The outer face of prism 74 is coated, in laminated sequence, with a similar pile-of-plates or reflecting polarizer 80 and with a quarter wave stratum 82. In accordance with the present invention, surface 84 of prism 76, which intersects the interface between prisms 76, 74 and which generally coincides with the boundary of the diverging beam from source 70, is coated with a reflex reflecting stratum that is identical to that shown at 52 in FIG. 2(a) or at 62 in FIG. 2(b). The operation of beam splitter 72 is such that a beam 86 is divided into two polarized components 88, 90. Component 88 is directed through polarizing strata 78, 80 toward the subject. Beam 90 is reflex reflected at 76 toward polarizing stratum 78 and is returned to source 70. In source 70, particularly at the filament, the returned beam 90 is at least partially depolarized and redirected by the reflector and lens toward the subject in the same manner as was original beam 88. Thus, beam 88, together with an added increment of beam 90, are transmitted through strata 80, 82, reflex reflected from the subject and reflected by strata 80, 82 to a viewing screen, in the manner described above in connection with FIG. 1.

Conclusion

The present invention thus provides a simple but efficacious technique for improving the efficiency with which illumination is utilized in an opaque projector. It will be understood that, although the beam-splitting subsystems illustrated in FIGS. 1 and 3 are primarily useful in connection with reflex reflecting subjects, certain principles thereof are applicable in connection with other types of subjects. Since certain changes may be made in the above described systems, and the components and processes thereof, without departing from the scope of the invention herein involved, it is intended that all matter, contained in the above description and shown in the accompanying drawing, shall be interpreted in an illustrative and not a limiting sense.

I claim:

1. A projection system comprising:
   nondepolarizing means for association with a visual subject;
   projection means for casting an image of said visual subject; and
   polarization means for directing polarized light from a source to said nondepolarizing means and for directing polarized light from said nondepolarizing means to said image in cooperation with said projection means;
   said polarized light from said source and said polarized light from said nondepolarizing means being distinguishable by said polarization means.

2. The projection system of claim 1 wherein said nondepolarizing means includes a reflective metal.

3. The projection system of claim 1 wherein said nondepolarizing means is a reflex-reflector.

4. The projection system of claim 1 wherein said nondepolarizing means includes reflex reflecting microspheres.

5. The projection system of claim 1 wherein said polarization means includes reflection polarization means and retardation means, whereby said light from said source to said nondepolarizing means is substantially circularly polarized in one direction and said light from said nondepolarizing means to said polarization means is substantially circularly polarized in the opposite direction.

6. A projection system for visual subject matter in association with nondepolarizing means, said projection system comprising:
   projection means for casting an image of a visual subject;
   polarization means for splitting unpolarized light into two polarized components of light;
   said polarization means including cooperative transmission and reflection means for directing both components of light to said nondepolarizing means and for directing both components of light from said nondepolarizing means to said image in cooperation with said projection means;
   said components of light to said nondepolarizing means and said components of light from said nondepolarizing means being distinguishable by said polarization means.

7. The projection system of claim 6 wherein said nondepolarizing means includes a reflective metal.

8. The projection system of claim 6 wherein said nondepolarizing means is a reflex reflector.

9. The projection system of claim 4 wherein said nondepolarizing means includes reflex reflecting microspheres.

10. A projection system for visual subject matter in association with nondepolarizing means, said projection system comprising projection means for casting an image of a visual subject, reflection polarizing means for converting unpolarized light from a source to polarized light, said reflection polarizing means constituting cooperative reflection and transmission means for directing said polarized light to said nondepolarizing means and for direction polarized light from said nondepolarizing means to said image in cooperation with said projection means, said polarized light to said nondepolarizing means and said polarized light from said nondepolarizing means being distinguishable by said reflection polarizing means.

11. An optical projection system comprising beam splitting means and subject means, said beam splitting means transmitting a first polarized component of source radiation and reflecting a second polarized component of source radiation, said beam splitting means directing at last a part of said source radiation toward said subject means, optical means in association with said subject means for redirecting radiation incident thereupon as imaging radiation toward said beam splitting means, and retardation means for causing the polarization form of said source radiation incident on said subject means to differ from the polarization form of said imaging radiation, said beam splitting means including means for directing both said first polarized component and said second polarized component toward said subject means and means for directing a resulting corresponding polarized component from said subject means to an imaging means.

12. An optical projection system comprising beam splitting means and subject means, said beam splitting means transmitting a first polarized component of source radiation and reflecting a second polarized component of source radiation, said beam splitting means directing at least a part of said source radiation toward said subject means, optical means in association with said subject means for redirecting radiation incident thereupon as imaging radiation toward said beam splitting means, and retardation means for causing the polarization form of said source radiation incident on said subject means to differ from the polarization form of said imaging radiation, said subject means being monocular and said first component and said second component, after reflection at said beam splitter, forming the monocular image of said subject means.

13. An optical projection system comprising beam splitting means and subject means, said beam splitting means transmitting a first polarized component of source radiation and reflecting a second polarized component of source radiation, said beam splitting means directing at least a part of said source radiation toward said subject means, optical means in association with said subject means for redirecting radiation incident thereupon as imaging radiation toward said beam splitting means, and retardation means for causing the polarization form of said source radiation incident on said subject means to differ from the polarization form of said imaging radiation, said beam splitting means including a pair of parallel interfaces of which one interface is forward and the other interface is rearward, said first polarized component being transmitted through a first section of said forward interface, said second polarized component being reflected by said first section of said forward interface, said second polarized component being reflected by said rearward interface and being transmitted through a second section of said forward interface.

14. An optical projection system comprising beam splitting means and subject means, said beam splitting means transmitting a first polarized component of source radiation and reflecting a second polarized component of source radiation, said beam splitting means directing at least a part of said source radiation toward said subject means, optical means in association with said subject means for redirecting radiation incident thereupon as imaging radiation toward said beam splitting means, and retardation means for causing the polarization form of said source radiation incident on said subject means to differ from the polarization form of said imaging radiation, said beam splitting means being capable of optically acting upon a beam of radiation composed of relatively oblique rays, and said beam splitting means including a reflex reflecting stratum disposed along a boundry of said beam.

References Cited

UNITED STATES PATENTS

| | | | |
|---|---|---|---|
| 2,167,149 | 7/1939 | Grote | 350—103 |
| 2,437,061 | 3/1948 | Wright | 352—60 |
| 3,277,782 | 10/1966 | Smith | 350—147 X |
| 3,285,126 | 11/1966 | Lucas | 88—24 |
| 3,310,900 | 3/1967 | Hamilton et al. | 350—105 X |
| 2,944,463 | 7/1960 | Rantsch | 88—24 |

NORTON ANSHER, *Primary Examiner.*

R. M. SHEER, *Assistant Examiner.*